May 5, 1942.  G. F. HOCHRIEM  2,281,769
LEVELING DEVICE FOR SCALES AND OTHER OBJECTS
Filed Aug. 7, 1940
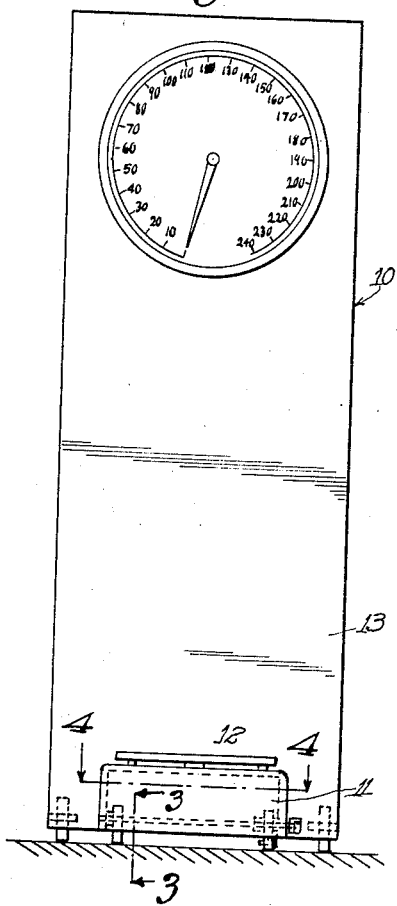
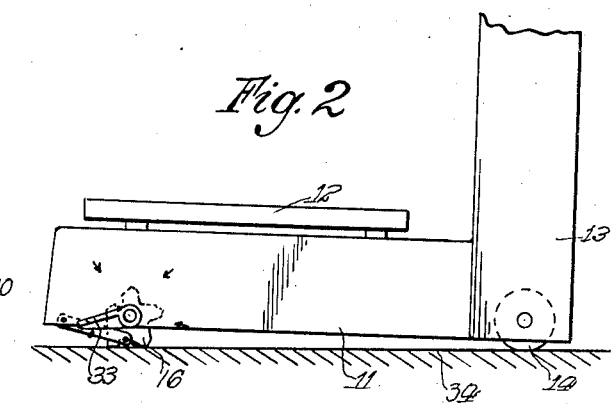
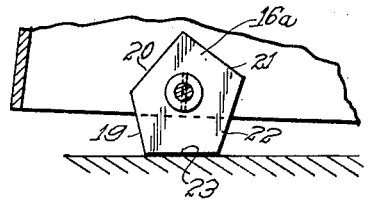
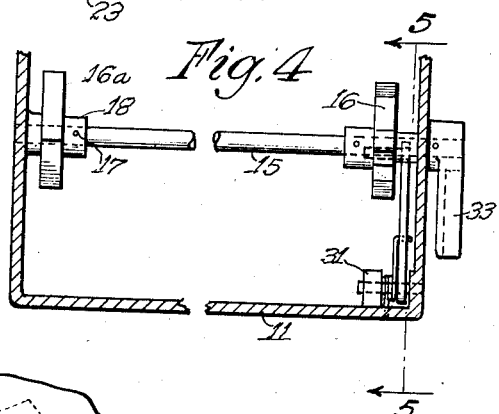
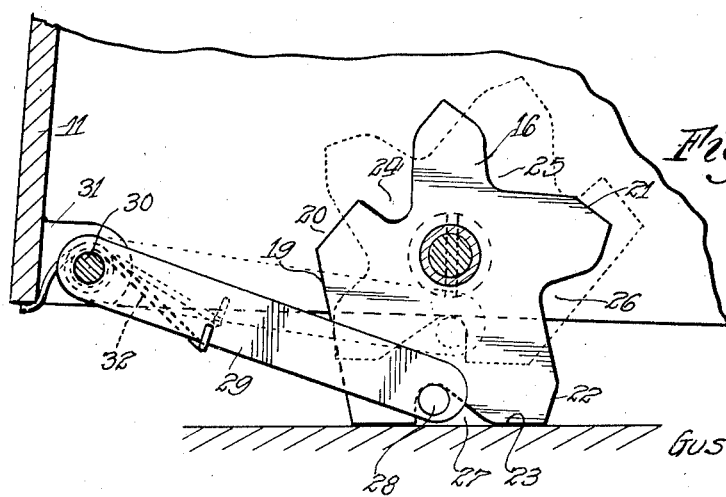
Inventor
GUSTAV F. HOCHRIEM
by Henry Heck
Attorney.

Patented May 5, 1942

2,281,769

UNITED STATES PATENT OFFICE 2,281,769

LEVELING DEVICE FOR SCALES AND OTHER OBJECTS

Gustav F. Hochriem, Chicago, Ill., assignor to Public Scale Company, a corporation of Illinois Application August 7, 1940, Serial No. 351,675

2 Claims. (Cl. 248—23)

The invention relates to leveling devices, and particularly to devices adapted to maintain objects in operative position, such as platform scales.

In placing or positioning a platform scale, it is desirable that the platform is arranged in a horizontal plane for proper functioning of the device. This requirement cannot be met where the floor slants unless special provisions are made to compensate for the slant.

It, therefore, constitutes one of the principal objects of the invention to provide means for compensating for unevenness in the floor to maintain the object in proper position.

A further object is the provision of compensating means which is secured to the object.

A still further object constitutes the provision of adjustable compensating means to counteract various degrees of slant.

Another object is the provision of means for locking the compensating means in adjusted position.

With these and other important objects in view, which will become apparent from a perusal of the invention, the latter comprises the means described in the following specification, particularly pointed out in the claims forming a part thereof, and illustrated in the accompanying drawing, in which:

Fig. 1 is a front view of a scale to which my invention has been applied,

Fig. 2 is a fragmentary side view of the scale,

Fig. 3 is a fragmentary section on the line 3—3 of Fig. 1,

Fig. 4 is an enlarged section on the line 4—4 of Fig. 1, and

Fig. 5 is an enlarged section on the line 5—5 of Fig. 4.

Referring to the drawing, the scale, generally designated by 10, includes a base frame 11 on which a movable platform 12 is mounted and a housing 13 is supported on rollers 14. A shaft 15 is journaled in the side walls of the base frame.

A cam member 16 and 16a, respectively, is mounted on each side wall on the shaft 15, and secured thereto by a pin 17 extending through the shaft and a hub 18 formed integrally with the cam member. The cam member has sides to form an irregular pentagon. Each side is at different distance from the center of the shaft so that progressively increasing heights for the shaft 15 from the floor line is obtained upon turning of the cam member, as will be readily understood by reference to Fig. 5.

The cam members 16 has sides 19, 20, 21, 22 and 23. The sides 20, 21, 22 and 23 are provided with a cut-out portion respectively designated as 24, 25, 26 and 27, and each cut out portion is designed to cooperate with a pin 28 of an arm 29 pivotally secured at 30 to a lug 31 projecting from the front wall of the base frame. A spring 32 urges the arm 29 and, therewith, the pin 28 toward the cam member.

The shaft 15 extends beyond one side wall and is provided with a handle 33 to facilitate turning of the shaft 15.

The use of the invention is as follows:

In placing the scale on a floor 34 which slants, the handle 33 is actuated to turn the shaft and, therewith, the cam members, it being evident that, by reason of the straight parts of the cutout portions, rotation of the cam members can only be had in counter-clockwise direction, as viewed in Fig. 5.

Turning of the shaft is continued until the proper side engages the floor so that the platform 12 extends in horizontal direction.

The invention is illustrated by way of example in conjunction with a scale, but may be adopted wherever leveling of an object is required.

Nor is the particular construction and arrangement of parts shown by way of limitation, but merely by way of example. Any variation, change or alteration is included which falls within the scope of the invention, as defined in the appended claims.

I claim:

1. In a platform scale having a base frame, a shaft journaled in said frame, means for locking said shaft against rotation in one direction, a pair of members secured to said shaft and having peripheral portions at varying distances from the axis of said shaft for engagement with the floor, and means for causing rotation of said shaft in the other direction.

2. In a platform scale having a base frame, a shaft journaled in said frame, means for locking said shaft against rotation in one direction, a pair of members secured to said shaft and having peripheral portions at varying distances from the axis of said shaft for engagement with the floor for rotating said shaft, and means for automatically locking said shaft against rotation at a desired position of said members.

GUSTAV F. HOCHRIEM.